United States Patent
Gelardi et al.

(10) Patent No.: US 6,357,153 B1
(45) Date of Patent: Mar. 19, 2002

(54) MOVABLE DISPLAY MULTIPLE IMAGE TAG AND KEY CHAIN

(76) Inventors: Tatiana L. Gelardi; Anthony Gelardi, II, both of P.O. Box 2757, Kennebunkport, ME (US) 04046; Stephen D. Fantone, 340 Summer St., Lynnfield, MA (US) 01940; John A. Gelardi; Anthony L. Gelardi, both of P.O. Box 2757, Kennebunkport, ME (US) 04046

(*) Notice: Subject to any disclaimer, the term of this patent is extended or adjusted under 35 U.S.C. 154(b) by 0 days.

(21) Appl. No.: 09/185,598

(22) Filed: Nov. 4, 1998

Related U.S. Application Data

(60) Provisional application No. 60/064,232, filed on Nov. 4, 1997.

(51) Int. Cl.$^7$ .............................................. G03B 25/02
(52) U.S. Cl. .............................. 40/454; 40/513; 40/634; 70/456 R
(58) Field of Search .......................... 40/454, 634, 649, 40/653, 490, 491, 513, 709, 765, 776; 70/456 R, 460; 359/463, 462, 477, 619; 312/9.57, 9.63

(56) References Cited

U.S. PATENT DOCUMENTS

| | | | | |
|---|---|---|---|---|
| 3,633,301 A | * | 1/1972 | Calabuig ..................... | 40/454 |
| 4,215,497 A | * | 8/1980 | Levy .......................... | 40/649 |
| 4,546,561 A | * | 10/1985 | Ackeret ..................... | 40/490 X |
| 4,704,770 A | * | 11/1987 | Minami et al. ........... | 40/634 X |
| 5,098,302 A | | 3/1992 | Sekiguchi | |
| 5,100,330 A | | 3/1992 | Sekiguchi | |
| 5,146,703 A | * | 9/1992 | Boden ........................ | 40/454 |
| 5,161,979 A | | 11/1992 | Sekiguchi | |
| 5,197,886 A | | 3/1993 | Sekiguchi | |
| 5,364,274 A | | 11/1994 | Sekiguchi | |
| 5,494,445 A | | 2/1996 | Sekiguchi et al. | |
| 5,588,526 A | * | 12/1996 | Fantone et al. | |
| 5,710,666 A | | 1/1998 | McDonald | |
| 5,758,987 A | * | 6/1998 | Frame et al. | |
| 5,933,994 A | * | 8/1999 | Miraresh ................... | 40/649 |
| 6,070,350 A | * | 6/2000 | Fantone et al. ........... | 40/765 X |
| 6,098,328 A | * | 8/2000 | Belfiglio et al. .......... | 40/649 X |

FOREIGN PATENT DOCUMENTS

| | | | |
|---|---|---|---|
| FR | 1497493 | * | 9/1967 |
| NL | 7901570 | * | 9/1979 |

* cited by examiner

*Primary Examiner*—Brian K. Green
(74) *Attorney, Agent, or Firm*—James Creighton Wray; Meera P. Narasimhan

(57) ABSTRACT

A device for displaying multiple images in an animation-like manner is provided. The device includes an outer shell having a pair of opposed transparent lenticular surfaces and a pair of opposed side walls extending between opposed outer edges of the lenticular surfaces thereby forming a hollow rectangular cavity. The device also includes a generally rectangular slide insertable through an opening in the first end of the cavity. Interleaved images are positioned on the opposed faces of the slide. The device further includes a part for reciprocating the slide in the cavity thereby altering the appearance of the displayed image. The reciprocating part includes a detent slot formed in an interior region of each of the side walls of the outer shell and a corresponding pair of spring bar mounted detent tabs for engaging the detent slots. A spring bar is positioned generally parallel to the second end of the slide and dihedral spring leaves are positioned in a center of the spring bar. The spring bar and the spring leaves bias the slide away from the second end of the outer shell. A push bar extends from the first end of the slide through the opening. The push bar enables the slide to be reciprocated in the outer shell. Pushing the push bar against the force of the spring bar and spring leaves alters the appearance of the displayed image.

39 Claims, 3 Drawing Sheets

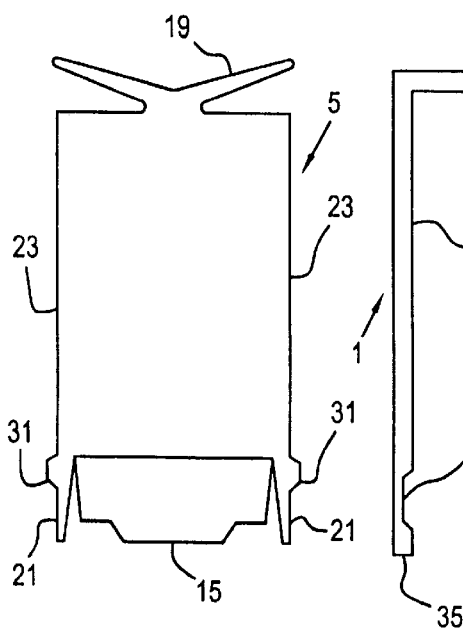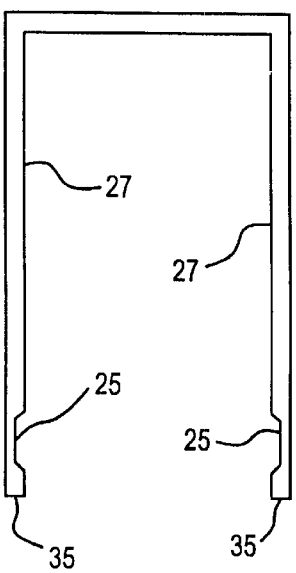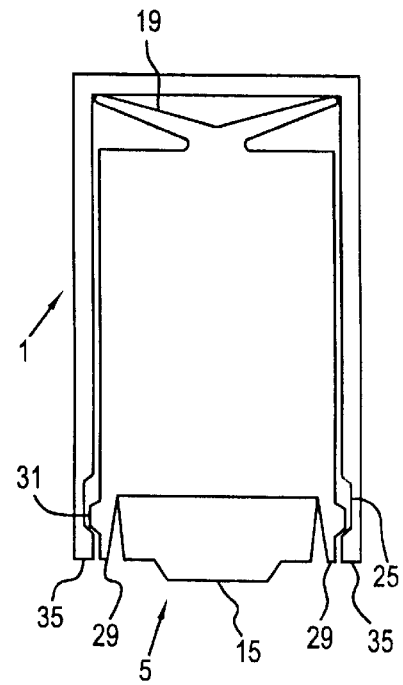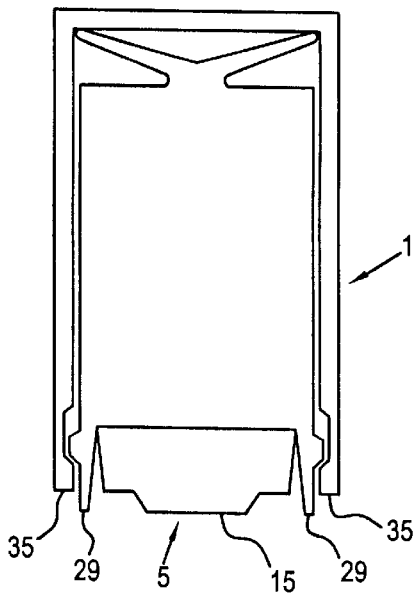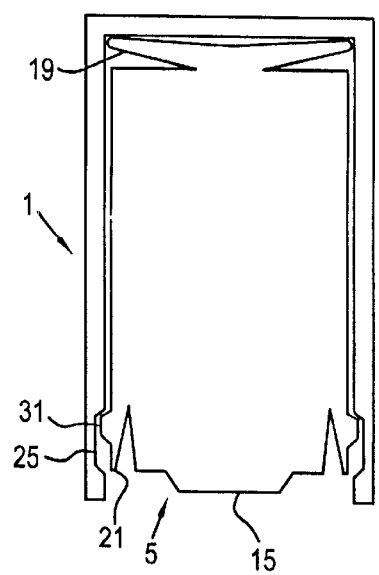

FIG. 9 FIG. 10 FIG. 11
FIG. 12 FIG. 13
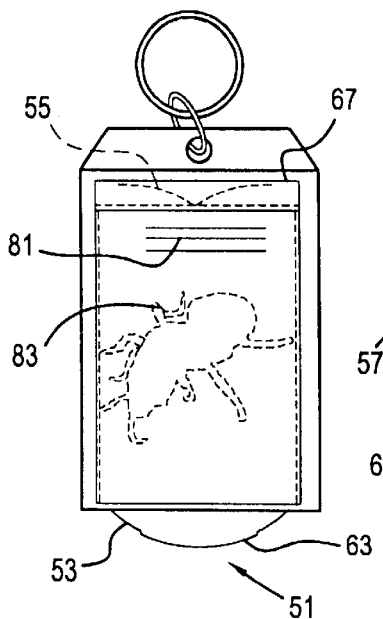
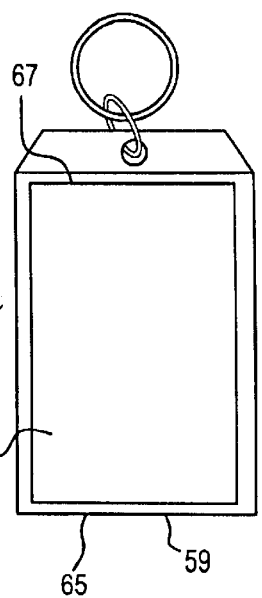
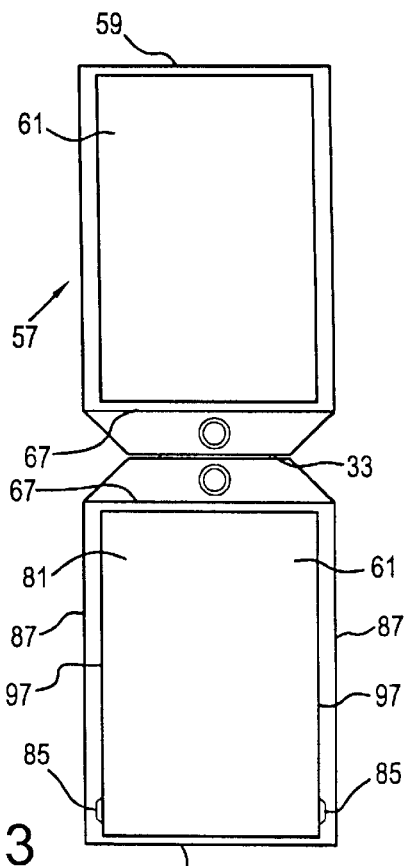
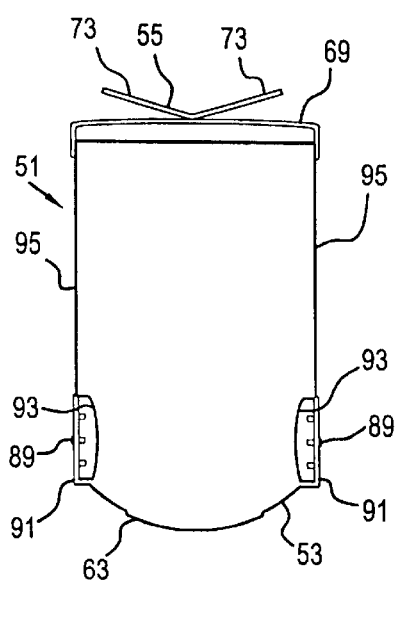
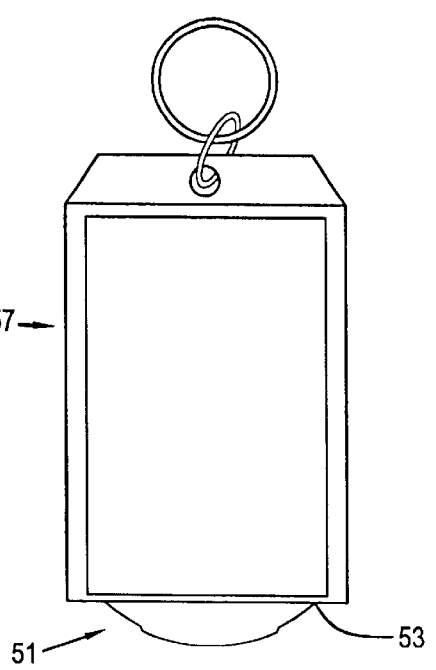

MOVABLE DISPLAY MULTIPLE IMAGE TAG AND KEY CHAIN

This application claims the benefit of U.S. Provisional Application No. 60/064,232, filed Nov. 4, 1997.

BACKGROUND OF THE INVENTION

Displaying multiple images in an animation-like manner is accomplished by placing a lenticular surface over a substrate having multiple interleaved images printed or formed thereon. A change in the position of the underlying substrate relative to the lenticular surface impacts which of the multiple images is displayed with respect to a fixed viewing angle. Likewise, a change in the viewing angle similarly impacts which of the multiple images is displayed.

Numerous different devices used to produce such displays are known. However, none of those devices are known to have a similar structure to or to function in a manner similar to the present invention.

SUMMARY OF THE INVENTION

The present invention relates generally to devices capable of displaying multiple images. More particularly, the invention relates to a pendant tag or key chain that utilizes detents and compound springs to display multiple interleaved images in an animation-like manner.

The present invention is a pendant tag or key chain casing with a reciprocating insert for displaying multiple images in an animation-like manner. The casing or outer shell forms a cavity therein for receiving the insert or slide. Multiple interleaved images are positioned on the slide and transparent lenticular surfaces are formed on the outer surfaces of the outer shell. As a result of the combination of those elements, movement of the slide within the cavity displays the images in an animation-like manner by creating motion, morphing, animation, text change or three dimensional ("3D") images.

In a preferred embodiment, the outer shell may be made in two separate or hinged generally flat rectangular plates, which are then snapped, bonded or welded together. The plates are preferably joined together at one end by a living hinge. The plates are rotatable about the hinged end to a closed position in which they are generally parallel one another. A plurality of gripper extensions extending from peripheral regions of the inner surface of one of the plates are engageable with a plurality of cooperating depressions formed in peripheral regions of inner surfaces of the other plate to secure the plates together in the closed position. The cavity is created from complimentary depressions formed in central regions of the inner surface of each plate. Finally, an opening is formed in a first end of the outer shell opposite the living hinge for permitting access to the cavity and an aperture or slot is formed in a closed second end of the outer shell for attaching a ring or chain thereto.

Pockets on one or both faces of the outer shell contain lenticular lenses. The lenses are held in place by any means such as being press fit with the outer shell. Thus, the outer surfaces of the lenses are recessed below the shell edges to prevent scratching of the lens surfaces. In another preferred embodiment, lenticular surfaces are formed directly on the outer surfaces of the plates.

The inner slide/frame or mid-frame is insertable into the cavity through the opening. The slide is preferably rectangular having opposed faces and a pair of opposed edges and a pair of opposed ends that define the perimeter of the faces. Preferably, each face has pockets for receiving printed graphic inserts containing multiple interleaved images printed or otherwise formed thereon. In another embodiment, the graphics may be printed or otherwise formed directly onto the faces of the slide.

The invented device also includes means for reciprocating the slide in the cavity. As explained earlier, such movement of the slide with respect to the fixed lenticular surfaces of the outer shell alters the appearance of the displayed image. In a preferred embodiment, the reciprocating means includes an axial detent slot formed in an interior region of each of the side walls of the outer shell and a pair of corresponding detent tabs extending from the opposed edges of the slide. The detent tabs extend into the detent slots which thereby limit movement of the slide in the cavity. Preferably, the detent slots and the detent tabs are positioned proximate to the open end of the outer shell.

The reciprocating means also act to releasably secure or lock the slide within the cavity of the outer shell. In a preferred embodiment, the detent tabs are each mounted on a detent spring bar. Each detent spring bar is positioned adjacent a detent recess formed in the slide. The detent spring bars bias the detent tabs toward the detent slots which hold the slide within the cavity of the outer shell. By applying sufficient force to the push bar, the force of the detent spring bars can be overcome and the slide can be removed from the cavity of the outer shell.

Either one or both ends of the detent spring bars are connected to the slide. In a preferred embodiment, the side locking detent spring bars are molded on the sides of the slide. Detent recesses in the inner sides of the outer shell sidewalls hold the slide in place. The side locking detent spring bars engage the recesses in the outer shell side walls. The ends of the side locking springs are within the outer shell so that the slide cannot be removed. In another preferred embodiment, the ends of the side locking springs extend beyond the outer shell and squeezing the ends of the springs allows removal of the slide for replacing or mounting new images.

The slide being removable and being capable of removably receiving the graphics insert, enables the manufacturer, distributor, retailer or consumer to add/change multi-image graphic inserts at any time.

In a preferred embodiment, the slide has a push bar molded at a first end and a spring molded at a second end. The push bar protrudes through the opening in the first end of the outer shell. Pushing the push bar causes the slide to move within the cavity. Tabs are preferably positioned on a distal portion of the push bar exterior to the cavity for facilitate gripping the push bar.

The spring is preferably integral with the slide and acts to bias the slide away from the second end of the outer shell. In a preferred embodiment, the spring is a pair of dihedral spring leaves having proximate ends connected to a center of the second end of the slide and distal ends remote from the second end of the slide. When the push bar is pressed, the spring leaves are simultaneously and conjunctively elastically deformed as the spring is urged against the closed second end of the cavity.

In another preferred embodiment, two springs are utilized to bias the slide away from the second end of the outer shell. The first spring is a spring bar positioned generally parallel to the second end of the slide. The ends of the spring bar are preferably connected to the second end of the slide. The second spring is a pair of dihedral spring leaves having proximal ends connected to a center on the spring bar and distal ends remote from the spring bar. When the push bar is pressed, the spring leaves and the spring bar are simultaneously and conjunctively elastically deformed as the springs are urged against the closed second end of the cavity.

These and further objects and features of the invention are apparent in the disclosure, which includes the above and ongoing written specification, with the claims and the drawings.

BRIEF DESCRIPTION OF THE DRAWINGS

FIG. 4 is a top view of the inner slide of the key chain assembly of FIG. 1.

FIG. 5 is a top view of the outer shell of the key chain assembly of FIG. 1.

FIG. 6 is a top view of the inner slide within the outer shell of the key chain assembly of FIG. 1.

FIG. 7 is a top view of the inner slide with elongated side locking springs within the outer shell of the key chain assembly of FIG. 1.

FIG. 8 is a top view of the inner slide compressed within the outer shell of the key chain assembly of FIG. 1.

FIG. 9 is a top view of another preferred embodiment of the invented key chain assembly.

FIG. 10 is a top elevation of the outer shell of the key chain assembly of FIG. 9.

FIG. 11 is a top elevation of an unassembled outer shell of the key chain assembly of FIG. 9.

FIG. 12 is a top elevation of the slide of the key chain assembly of FIG. 9.

FIG. 13 is a top elevation showing a blank slide inserted into the outer shell of the key chain assembly of FIG. 9.

DETAILED DESCRIPTION OF THE PREFERRED EMBODIMENTS

Figure 1:
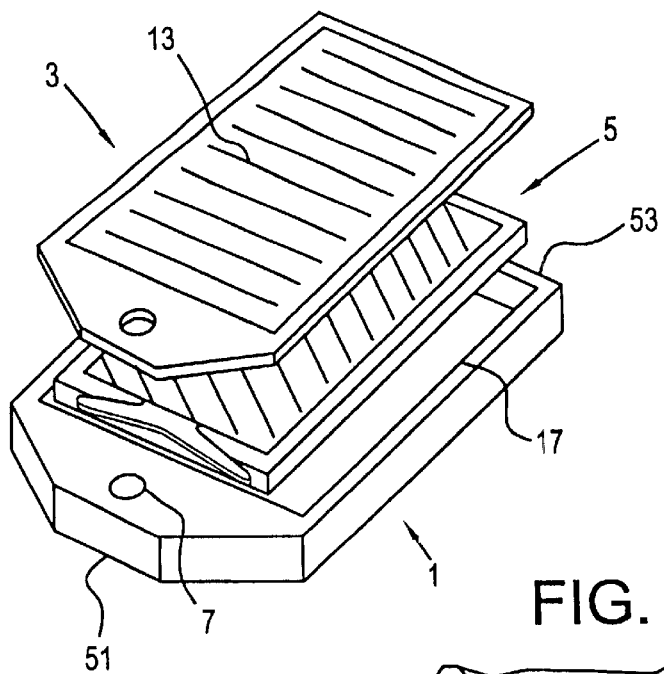
FIG. 1 is an exploded view of a preferred embodiment of the invented key chain assembly.

As shown in FIG. 1, the device has an outer shell 1 with transparent lenticular lens surfaces 3 and an inner slide or frame 5 with multiple interleaved images on surfaces. The outer shell 1 may be made in two separate pieces which are then snapped, bonded or welded together. Alternatively, the shell may be a unitary hinged piece.

One end 51 of the outer shell 1 has a hole 7 or slot for providing attachments such as, but not limited to a ring or chain. The other end 53 of the outer shell 1 has an opening 11, shown as a rectangular one in FIG. 2, for receiving the inner slide 5.

Figure 2:
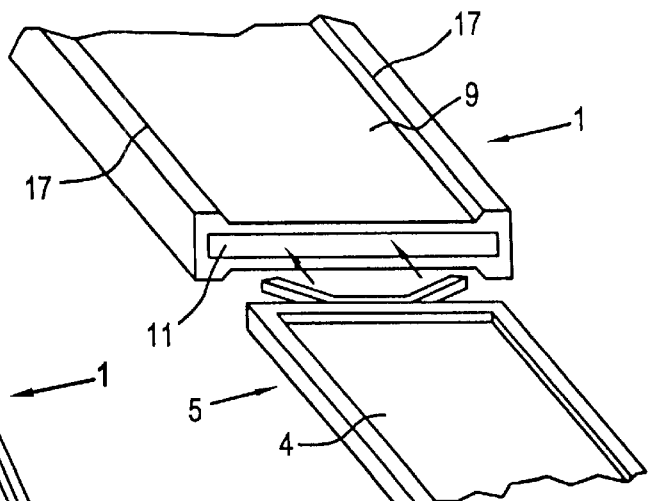
FIG. 2 is a perspective view of the inner slide fitting into the outer shell of the key chain assembly of FIG. 1.

As shown in FIG. 2, pockets 9 on opposite outer faces of the outer shell 1 contain lenticular lenses 3. The lenses 3 may be press fit in the outer shell 1. The outer surfaces 13 of the lenses 3 are preferably recessed below the shell edges 17 to prevent scratching of the lens surfaces.

The opposing sides of the slide/frame 5 have pockets 4 for receiving printed graphic inserts, as shown in FIG. 2. In another embodiment, the graphics may be printed directly onto the slide 5. Preferably, frame 5 is removably positioned in the outer shell. Also, frame 5 may removably receive the graphics insert, allowing easy replacement and interchanging of the graphics at any stage.

Figure 3:
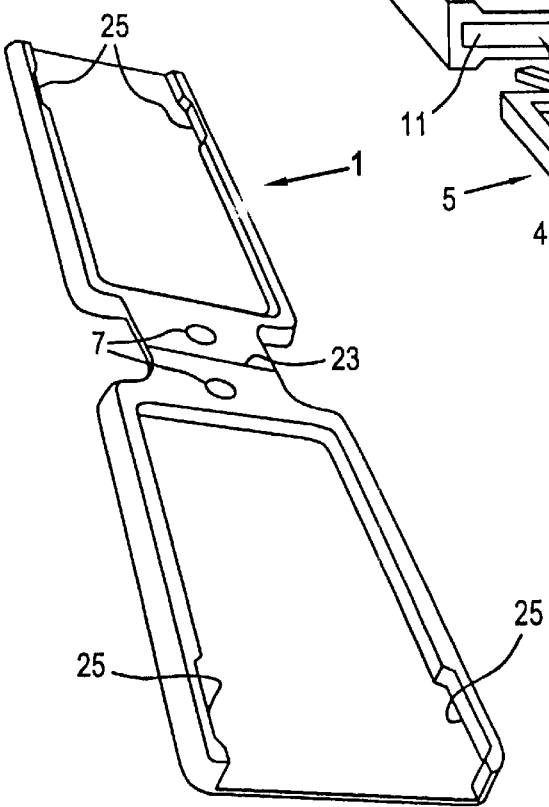
FIG. 3 is a perspective view of an unassembled outer shell of the key chain assembly of FIG. 1.

FIG. 3 shows the outer shell 1 made as a unitary piece. The two opposing pieces of the shell are joined by a living hinge 33. The outer shell may be of any material, preferably an opaque or a transparent material.

The inner slide 5, shown in FIG. 4, is fitted within the outer shell 1. Preferably, slide 5 is removably attached in the shell 1. The slide 5 has a spring 19 molded at one end and a push bar 15 at the other end. Spring 19 is preferably integral with the frame or slide 5. Side locking springs 21 are molded on the sides 23 of the slide 5.

Recesses 25 in the shell 1 (FIGS. 4 and 5) hold the inner slide 5 in place. The side locking springs 21 of the frame or slide 5 engage the recesses 25 in the outer shell side walls 27 when assembled.

As shown in FIG. 6, springs 21 engage recesses 25, so that the slide 5 cannot be easily removed. In preferred embodiments, ends 29 may be of similar length as ends 35 of the outer shell 1 and remain flush within the ends of the outer shell when the slide and shell are assembled. In FIG. 6, ends 29 are level with ends 35 of the outer shell 1.

In another preferred embodiment shown in FIG. 7, the ends 29 of the side locking springs 21 protrude from beyond the ends 35 of the outer shell 1. Pressing the ends 29 of the springs inward allows removal of the slide for replacing or mounting new images.

Pushing the push bar 15 causes the slide to move within its cavity creating motion, morphing, animation, text change or 3D images. The slide 5 is made from materials with a low coefficient of friction so that it slides easily within the outer shell 1.

As shown in FIG. 8, the slide 5 moves within the outer shell 1 until the notches 31 of the side locking springs 21 are stopped by the end of the recess 25 in the inner wall of the outer shell. As the slide 5 moves forward within the outer shell 1, the spring 19 is compressed. When the push bar 15 is released the spring 19 returns the slide 5 to its original position, as shown in FIG. 6. Frame or slide 5 may have two recessed top and bottom pockets to receive printed graphic inserts on one or both sides, as shown in FIG. 2. The graphics may be fitted in the frame 5 by any means, such as by press-fitting or snap-fitting.

As the inner frame is removable from the shell and is capable of removably receiving the graphics insert, it allows for the manufacturer, distributor, retailer or consumer to add/change multi-image graphic inserts in the frame at any time.

In a preferred embodiment, shown in FIGS. 9 through 13, the slide 51 (FIG. 12) has a push bar 53 molded at a first end and a spring 55 molded at a second end. The push bar 51 protrudes through the opening 59 (FIGS. 9 and 13) in the first end 65 of the outer shell 57. Pushing the push bar 51 causes the slide 51 to move within the cavity 61. Tabs 63 are preferably positioned on a distal portion of the push bar 51 exterior to the cavity for facilitate gripping the push bar.

The spring 55 is preferably integral with the slide 51 and acts to bias the slide away from the second end 67 of the outer shell 57. In a preferred embodiment, the spring 55 is a pair of dihedral spring leaves 73 having proximate ends connected to a center of the second end 71 of the slide and distal ends remote from the second end of the slide. When the push bar 53 is pressed, the spring leaves are simultaneously and conjunctively elastically deformed as the spring 55 is urged against the closed second end 67 of the cavity 61.

In another preferred embodiment, two springs 55 and 69 are utilized to bias the slide 51 away from the second end 67 of the outer shell 57. The first spring is a spring bar 69 positioned generally parallel to the second end 71 of the slide. The ends of the spring bar are preferably connected to the second end 71 of the slide 51. The second spring is a pair of dihedral spring leaves 73 having proximal ends connected to a center on the spring bar 69 and distal ends remote from the spring bar. When the push bar 51 is pressed, the spring leaves 73 and the spring bar 69 are simultaneously and conjunctively elastically deformed as the springs are urged against the closed second end 67 of the cavity 61.

The invented device also includes means for reciprocating the slide in the cavity. Movement of the slide 51 with respect to the fixed lenticular surfaces 81 of the outer shell 57 alters the appearance of the displayed image 83, as shown in FIG. 9. In a preferred embodiment, the reciprocating means includes an axial detent slot 85 (FIG. 11) formed in an interior region of each of the side walls 87 of the outer shell 57 and a pair of corresponding detent tabs 89 (FIG. 12) extending from the opposed edges of the slide 51. The detent tabs 89 extend into the detent slots 85 which thereby limit movement of the slide in the cavity. Preferably, the detent slots 85 and the detent tabs 89 are positioned proximate to the open end 59 of the outer shell 57.

The reciprocating means also act to releasably secure or lock the slide within the cavity 61 of the outer shell 57. In a preferred embodiment, the detent tabs 89 are each mounted on a detent spring bar 91. Each detent spring bar 91 is positioned adjacent a detent recess 93 formed in the slide 51. The detent spring bars 91 bias the detent tabs 89 toward the detent slots 85 that hold the slide 51 within the cavity 61 of the outer shell 57. By applying sufficient force to the push bar 53, the force of the detent spring bars 91 may be overcome and the slide 51 may be removed from the cavity 61 of the outer shell 57. Additionally, tabs 63 on the push bar 53 are larger than the opening 59 in the end of the outer shell 57 so that the slide 51 is prohibited from being pushed too far into the outer shell.

While the invention has been described with reference to specific embodiments, modifications and variations of the invention may be constructed without departing from the scope of the invention, which is defined in the following claims.

We claim:

1. A device for displaying multiple images in animation, comprising:
   an outer shell forming a generally hollow cavity;
   said outer shell having opposed transparent lenticular surfaces, opposed side walls extending between opposed outer edges of said lenticular surfaces, and an opening formed at the first end of said outer shell;
   a slide having opposed faces and insertable through said opening into said cavity;
   at least one interleaved image positioned on each of said opposed faces of slide; and
   reciprocating means for allowing movement of said slide in said cavity thereby altering the appearance of the displayed image.

2. The device of claim 1 wherein said slide has a pair of opposed edges and a pair of opposed first and second ends defining a perimeter around said opposed faces and wherein said reciprocating means comprises a detent axial slot formed in an interior region of each of said side walls of said outer shell and a pair of corresponding detent tabs extending from said opposed edges of slide for engaging said detent slots.

3. The device of claim 2 wherein said detent tabs are each mounted on detent spring bars.

4. The device of claim 2 wherein said detent slots are positioned proximate to said first end of said outer shell and said detent tabs are positioned proximate to said first end of said slide.

5. The device of claim 2 further comprising a first spring positioned adjacent said second end of said slide for biasing said slide away from a second end of said outer shell.

6. The device of claim 5 wherein said first spring is a pair of dihedral spring leaves having proximate ends connected to a center of said second end of said slide and distal ends remote from said second end of said slide.

7. The device of claim 2 further comprising a first spring positioned adjacent said second end of said slide and a second spring positioned adjacent said first spring opposite said second end of said slide and wherein said springs bias said slide away from a second end of said outer shell.

8. The device of claim 7 wherein said first spring is a spring bar positioned generally parallel to said second end of said slide and having ends connected to said second end of said slide and wherein said second spring is a pair of dihedral spring leaves having proximate ends connected to a center on said spring bar and distal ends remote from said spring bar.

9. The device of claim 2 further comprising a push bar extending from said first end of said slide through said opening for reciprocating said slide within said cavity.

10. The device of claim 9 further comprising tabs positioned on a distal portion of said push bar exterior to said cavity for gripping said push bar.

11. The device of claim 1 wherein said outer shell further comprises a closed second end having an aperture formed therein for attaching a ring or chain thereto.

12. The device of claim 11 wherein said outer shell further comprises a first section, a second section hingedly attached to said first section and means for securing said first section to said second section in a closed position in which said first section and said second section are substantially parallel to one another.

13. The device of claim 1 wherein said cavity is substantially rectangular and wherein said slide is substantially rectangular and generally correspond in shape and size to said cavity.

14. A device for displaying multiple images in animation, comprising:
   an outer shell forming a generally hollow cavity;
   said outer shell having opposed surfaces, at least one of said surfaces being generally transparent and having lenticular lenses formed therein, opposed side walls extending between opposed outer edges of said surfaces, and an opening formed at a first end of said outer shell;
   a slide insertable through said opening into said cavity;
   said slide having opposed faces and opposed sides and opposed first and second ends, said sides and ends defining a perimeter around said opposed faces;
   at least one of said opposed faces having at least one interleaved image positioned thereon;
   an axial slot formed in an interior region of each of said side walls of said outer shell;
   a pair of detent recesses formed in said opposed faces of said slide;
   a pair of detent spring bars extending linearly from said opposed sides of said slide adjacent said detent recesses;
   corresponding detent tabs mounted on said detent spring bars for engaging respective detent slots;
   a spring bar positioned generally parallel to said second end of said slide;
   a pair of dihedral spring leaves having proximate ends connected to a center of said spring bar and distal ends remote from said spring bar;

wherein said spring bar and said spring leaves bias said slide away from a second end of said outer shell; and a push bar extending from said first end of said slide through said opening and tabs positioned on a distal portion of said push bar exterior to said cavity;

wherein using said push bar to reciprocate said slide in said cavity alters the appearance of the displayed image.

15. The device of claim 14 wherein said axial slots are positioned proximate to said first end of said outer shell and said detents are positioned proximate to said first end of said slide.

16. The device of claim 15 wherein said outer shell further comprises a closed second end having an aperture formed therein for attaching a ring or chain thereto.

17. The device of claim 16 wherein said outer shell further comprises a first section, a second section hingedly attached to said first section and means for securing said first section to said second section in a closed position in which said first section and said second section are substantially parallel one another.

18. The device of claim 14 wherein said cavity is substantially rectangular and wherein said slide is substantially rectangular and generally correspond in shape and size to said cavity.

19. A multiple image display apparatus, comprising:

a slide;

a spring bar having ends connected to an end of said slide; and at least one spring leaf having a proximal end connected to said spring bar at a position remote from and between said ends of said spring bar;

wherein said at least one spring leaf is simultaneously and conjunctively elastically deformed when said at least one leaf is urged against an object by the spring bar.

20. The apparatus of claim 19 wherein said at least one spring leaf comprises a first spring leaf connected to said slide at a position remote from said ends of said spring bar and a second spring leaf connected to said slide at a position remote from said ends of said spring bar.

21. The apparatus of claim 20 wherein said first and second spring leaves are dihedral and have proximate ends connected to a center of said slide and distal ends remote from said slide.

22. The apparatus of claim 21 further comprising an outer shell forming a generally hollow cavity having inwardly facing lateral surfaces, said outer shell having opposed first and second ends and an opening in said first end of said outer shell for permitting said slide to be inserted into said cavity.

23. The apparatus of claim 22 further comprising, a pair of detent spring bars, each detent spring bar having an end connected to said slide and a detent tab extending outwardly from each of said detent spring bars and further comprising a pair of detent slots formed in said lateral surfaces for receiving said detent tabs.

24. The apparatus of claim 23 wherein said detent spring bars have first and second ends connected to said slide.

25. The apparatus of claim 24 wherein said slide has a first detent recess formed therein opposite said first detent spring bar and a second detent recess formed therein opposite said second detent spring bar.

26. The apparatus of claim 25 wherein said outer shell is formed from two generally flat plates joined together at said second end of said outer shell by a living hinge, wherein said cavity is formed from complimentary depressions formed on inner surfaces of said plates, and wherein said plates are secured together by cooperating extensions extending from one of said two plates engageable with gripper openings formed in the other of said two plates.

27. The apparatus of claim 26 where in lenticular surfaces are positioned in pockets formed on outer surfaces of said plates.

28. The apparatus of claim 26 wherein lenticular surfaces are formed on outer surfaces of said plates.

29. A multiple image display apparatus, comprising:

a slide;

a first detent spring bar having an end connected to said slide; and a first detent tab extending outwardly from said first detent spring bar, the spring bar having legs extending remotely from the spring bar to at least an end of the slide.

30. The apparatus of claim 29, wherein the end on said first detent spring bar is a first end, wherein said spring bar has a second end, and wherein the first and second ends are connected to said slide.

31. The apparatus of claim 30, further comprising a push bar on an end of the slide.

32. The apparatus of claim 30, further comprising a second detent spring bar positioned opposite said first detent spring bar, said second detent spring bar having first and second ends connected to said slide and a second detent tab extending outwardly from said second detent spring bar.

33. The apparatus of claim 32 further comprising an outer shell forming a generally hollow cavity having inwardly facing lateral surfaces, said outer shell having opposed first and second ends and an opening in said first end of said outer shell for permitting said slide to be inserted into said cavity and further comprising a pair of detent slots formed in said lateral surfaces for receiving said detent tabs.

34. The apparatus of claim 33 further comprising a spring bar having ends connected to an end of said slide; and at least one spring leaf connected to said spring bar at a position remote from said ends of said spring bar;

wherein said at least one spring leaf and said spring bar are simultaneously and conjunctively elastically deformed when said at least one leaf is urged against an object.

35. The apparatus of claim 34 wherein said at least one spring leaf comprises a first spring leaf connected to said spring bar at a position remote from said ends of said spring bar and a second spring leaf connected to said spring bar at a position remote from said ends of said spring bar.

36. The apparatus of claim 35 wherein said first and second spring leaves are dihedral and have proximate ends connected to a center of said spring bar and distal ends remote from said spring bar.

37. The apparatus of claim 36 wherein said outer shell is formed from two generally flat plates joined together at said second end of said outer shell by a living hinge, wherein said cavity is formed from complimentary depressions formed on inner surfaces of said plates, and wherein said plates are secured together by cooperating extensions extending from one of the two plates engageable with gripper openings formed in the other of the two plates.

38. The apparatus of claim 37 wherein lenticular surfaces are positioned in pockets formed on outer surfaces of said plates.

39. The apparatus of claim 37 wherein lenticular surfaces are formed on outer surfaces of said plates.

* * * * *